United States Patent [19]
Chrow

[11] 3,727,029
[45] Apr. 10, 1973

[54] COMPOSITE ELECTRICALLY HEATED TUBING PRODUCT

[75] Inventor: Albert E. Chrow, Chagrin Falls, Ohio

[73] Assignee: Samuel Moore and Company, Mantua, Ohio

[22] Filed: July 6, 1970

[21] Appl. No.: 52,668

Related U.S. Application Data

[62] Division of Ser. No. 672,377, Oct. 2, 1967, Pat. No. 3,522,413, which is a division of Ser. No. 379,638, July 1, 1964, Pat. No. 3,355,572.

[52] U.S. Cl. .................219/301, 137/341, 138/33, 138/138, 219/522, 219/535, 219/549
[51] Int. Cl. ...............................H05b 3/58
[58] Field of Search...............219/301, 535, 522, 219/528, 549; 137/341; 138/138, 139; 174/47; 338/256, 259, 210, 212, 214

[56] References Cited

UNITED STATES PATENTS

| | | |
|---|---|---|
| 3,269,422 | 8/1966 | Matthews et al.............219/301 UX |
| 2,168,067 | 8/1939 | Jones.........................219/301 UX |
| 2,824,209 | 2/1958 | Leipold......................219/308 UX |
| 3,120,600 | 2/1964 | True..........................219/301 |
| 1,995,302 | 3/1935 | Goldstein...................219/301 UX |
| 2,243,220 | 5/1941 | Pitman.......................219/301 UX |
| 2,578,280 | 12/1951 | Barnard......................219/301 UX |
| 3,315,703 | 4/1967 | Matthews et al.............219/301 UX |
| 2,829,671 | 4/1958 | Ernst et al..................219/301 UX |

FOREIGN PATENTS OR APPLICATIONS

| | | |
|---|---|---|
| 527,759 | 10/1940 | Great Britain...............219/301 |
| 857,534 | 12/1960 | Great Britain...............219/301 |
| 897,292 | 5/1962 | Great Britain...............219/301 |
| 1,429,597 | 1/1966 | France.......................219/301 |

*Primary Examiner*—A. Bartis
*Attorney*—Teare, Teare & Sammon

[57] ABSTRACT

An armored, corrosion-resistant, deformable composite tubing of uniform construction throughout its length which is adapted for use as a temperature-controlled sampling tubing comprises a flexible, heat conductive sampling line means having a passageway for transmitting a fluid therethrough. At least two electrical heating lines are helically disposed in heat transferring engagement around said sampling line, with the lines being in symmetrically disposed relationship with respect to each other and in engaging relation to the peripheral surface of said sampling line. A layer of fibrous filler material is disposed in encompassing and contacting relation around said sampling line means and said heating lines along the length thereof, and a layer of flexible tape helically is wound around the filler layer in encompassing and contacting relation to provide a moisture impervious barrier around the filler layer. A flexible polymeric layer encompassing and contacting said tape provides a protective and moisture resistant barrier, and a flexible, metallic, protective armor layer enclosing and contacting said polymeric layer provides high strength and crush resistance; and a flexible, polymeric outer sheath encompassing and contacting said protective armor layer throughout substantially its entire outer periphery so as to mechanically interlock therewith provides corrosion and moisture resistance.

10 Claims, 2 Drawing Figures

PATENTED APR 10 1973

3,727,029

INVENTOR
ALBERT E. CHROW
BY
Teare, Teare & Sammon
ATTORNEYS

COMPOSITE ELECTRICALLY HEATED TUBING PRODUCT

This application is a division of the application to Albert E. Chrow, Ser. No. 672,377, filed Oct. 2, 1967, now U.S. Pat. No. 3,522,413 which is a division of the application to Albert E. Chrow, Ser. No. 379,638, filed July 1, 1964, now U.S. Pat. No. 3,355,572.

BACKGROUND OF THE INVENTION

This invention relates in general to composite tubing, and more particularly to a composite tubing construction which is adapted for use in conveying a fluid, either liquid or gas, from one point to another, while maintaining the temperature of the conveyed fluid substantially constant throughout the length of the tubing.

This type of tubing presently finds its principal use in the chemical processing and petroleum refining industries, and is used, for example, for conveying a sample of fluid from a process line or a reaction vessel to an automatic instrument, such as a continuous sampling instrument, for example a chromatograph or infra-red spectograph. Samples of the fluid taken under these conditions generally should be maintained at a relatively elevated temperature because the viscosity of the fluid must be kept as low as possible. Moreover, in the case of a gas sample being transmitted, the gaseous sample must not be permitted to condense.

In the past, such sampling tubing usually has been custom made for a particular installation, but such tubing has not been uniform in construction and operating characteristics, and has not been completely satisfactory.

SUMMARY OF THE INVENTION

The present invention provides a composite tubing or sampling line bundle which may be mass produced, which may be readily installed, which is of uniform construction from one end thereof to the other end and will, therefore, provide uniform and accurate results from the use of the tubing. The invention also provides a tubing or sampling line bundle which is economical to use and which provides for precise control, within a relatively narrow range, of the temperature of the fluid flowing through the tubing.

Accordingly, an object of the invention is to provide a novel composite tubing product.

Another object of the present invention is to provide a composite tubing which is adapted for use as sampling tubing, and which is relatively easy to bend to the desired configuration for extending from the point of sampling to instrumentation, for handling the samples taken by the tubing, and wherein the tubing is of a uniform construction throughout its length, for providing consistent and accurate results from the sample taken.

Another object of the invention is to provide a novel composite tubing for sampling fluids comprising a sampling line with electrical heating means disposed in juxtaposed relation with the sampling line, and with a fibrous thermobarrier encompassing the line and electrical heating means, and a flexible sheath of plastic material encompassing the thermobarrier and the sampling line.

Another specific object of the invention is to provide a novel composite tubing for sampling fluids comprising, a generally linearly extending bendable sampling line, a plurality of solid electrical heating wires disposed in intimate engagement with the sampling line, and entwining thereabout in slow spirals, a layer of flexible fibrous filler and insulating material encompassing the sampling line and heating wires to give a symmetrical configuration to the bundle, a thermobarrier layer of flexible insulating tape wound about said filler material is overlapping relation, a flexible metallic protective cover layer encompassing the taped bundle with a layer of flexible polymeric plastic disposed between the metallic cover and the insulating tape, and an outer sheath of flexible polymeric plastic covering the metallic protective cover.

Other objects and advantages of the invention will be apparent from the following description taken in conjunction with the accompanying drawings.

DESCRIPTION OF THE PREFERRED EMBODIMENTS

Figure 1:
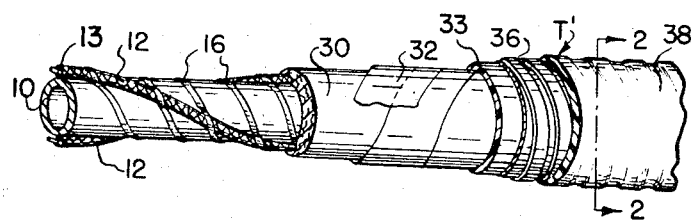
FIG. 1 is a partially cut-away fragmentary view of a composite tubing of the invention including a flexible armor layer.
Figure 2:
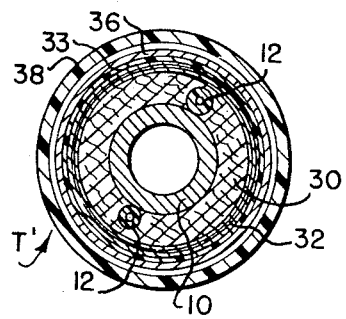
FIG. 2 is an enlarged transverse cross-sectional view taken generally along the plane of line 2—2 of FIG. 1, looking in the direction of the arrows.

Referring again to the drawings, there is shown a piece of composite tubing $T^1$ comprising a sampling or control line or tube 10 with electrical heating means or electrical heating wires 12 wrapped in spiral fashion about the sampling line 10 and in intimate contact therewith.

The sampling line 10 may be formed, for instance, of metallic material such as stainless steel, with the line having a wall thickness of for instance 0.035 inch. The heating wires 12 are of conventional type and for instance, a nickel-chromium wire insulated with a polymeric tape covered with a single fiberglass braid 13. The polymeric insulating tape on the electrical wires may be of the known thermoplastic material polytetrafluorethylene (commonly known as Teflon). The fiberglass braid on the electrical wires gives added mechanical protection to the wires.

The wires 12 are wound in a slow spiral about the sample tube 10 and are maintained in diametrically opposite condition with respect to the longitudinal axis of the tubing 10. In order to ensure the maintenance of the two electrical heating elements in said diametrically opposed condition, the wires are preferably wrapped with binder strands 16. Binder strands 16 may be comprised of one continuous strand of nylon fiber or the like wrapped in spiral relation about tube 10 and associated wires 12.

Surrounding the sampling tube and associated electrical heating wires there may be provided a layer 30 of filler material which may be formed of fibrous material, such as for instance jute, or other filamentary material, and which may be of a heat insulating character. This filler material provides a generally symmetrical configuration to the bundle and also provides a cushion for the bundle.

Wrapped about the layer of filler material 30 is a wrap of polymeric film tape 32, with the tape wound about the filler material with about a 25 percent overlap in the embodiment illustrated. An excellent material for the tape is found to be "Mylar" from the E. I. DuPont de Nemours and Company, which material is a polyethylene terephthalate polyester film of tough, strong characteristics, and which is impervious to moisture. Such polyester is of very high molecular weight (above 10,000) and formed from the reaction of equal moles of ethylene glycol and terephthalic acid. The polymeric tape may be of 1 mil. thickness. The tape is preferably wrapped sufficiently about the filler layer 30 to provide a nominal build-up of approximately 3/16 inch thickness of filler and tape. The tape may be of an asbestos-polyester laminate. Thus, the aforementioned "Mylar" may be laminated with asbestos in a known manner to provide such insulating tape. Covering the taped layer is a layer 33 of preferably extruded flexible plastic, such as the aforementioned polyvinyl chloride, which provides a protective and moisture resistant barrier for the taped bundle.

Covering such plastic encompassed bundle is a flexible metallic protective layer 36, such as BX armor or tape, to give a high strength, crush resistant armored tubing. A flexible sheath 38 of flexible plastic is then preferably extruded over the flexible armored layer 36. Sheath 38 acts to give corrosion and moisture resistance to the armored layer. Tape layer 32 also prevents any electro-galvanic action between the sampling line and the metallic armor 36. Moreover, the armor layer 36 materially increases the "pull" and "crush" resistance of the composite tubing, with the plastic sheath 38 mechanically interlocking with the interstices or corrugations in the armor layer 36. This outer jacket 38 may be formed of any suitable plastic material, such as for instance the polyvinyl chlorides, polyethylenes, polyurethanes, neoprenes, or fluoro carbons (e.g. Teflon).

The composite tubing of the invention enjoys reduced cost of installation as compared to custom made structures heretofore used, and is of considerably less bulk and weight per foot as compared to such prior art installations. The tubing because of its uniformity and reliability in operation gives much more uniform and accurate results from fluid samples taken thereby. While the sampling lines have been referred to as metallic, it will be understood that such lines may be of non-metallic materials and formed, for instance, of "Teflon" or nylon.

The product is capable with the 14 A.W.G.-solid heating wire, of giving approximately 9.25 watts per foot in ambient temperature ranges between approximately −20°F. and 100°F., and is capable of maintaining a temperature differential of up to about 200°F. Generally, the wattages can be increased for lower ambient temperatures. However, it has been found that the ambient temperature should be as low as possible within said range for higher wattages, since there is a definite maximum ambient temperature limitation on the wattages per foot for different sizes of heating wire and various wattage ranges. The electrical heating means, however, gives precise control over the temperatures maintained at the sampling tube.

From the foregoing description and accompanying drawings it will be seen that the invention provides a novel composite tubing comprising, a sampling line having electrical heating means disposed thereabout in generally spiral relation and about which is provided an insulating tape material, which in turn is jacketed with an outer flexible plastic sheath, which may include flexible armor, for protecting the tubing, and wherein the tubing may be readily installed and handled in a much more expeditious, convenient and inexpensive manner as compared to custom made arrangements.

The terms and expressions which have been used are used as terms of description and not of limitation, and there is no intention in the use of such terms and expressions, of exluding any equivalents of any of the features shown or described, or portions thereof, and it is recognized that various modifications are possible within the scope of the invention claimed.

I claim:

1. An armored, deformable composite tubing product of generally uniform construction throughout its length which is adapted for use as a temperature-controlled, sampling tubing and which comprises:
   a. a flexible, heat conductive sampling line means which has a passageway through it for conveying a fluid whose temperature is to be controlled;
   b. at least two electrical heating lines helically wound around said sampling line means in engaged, heat transferring relation, said lines being in generally symmetrically disposed relation with respect to the outer peripheral surface of said sampling line means;
   c. continuous, flexible polymeric strand means wound around said sampling line means and said heating lines for maintaining said heating lines in their helically disposed, engaged, heat transferring relation with said sampling line means;
   d. a layer of fibrous filler material disposed in encompassing and contacting relation around said sampling line means and said heating lines along the length thereof;
   e. a layer of flexible tape helically wound around said layer of filler material in encompassing and contacting relation to provide a moisture impervious barrier around said filler layer;
   f. a flexible, polymeric layer encompassing and contacting said tape layer and providing a protective and moisture resistant barrier;
   g. a flexible, metallic protective layer comprised of corrugated metal armor disposed around and contacting said polymeric layer throughout its length; and
   h. a flexible, polymeric outer sheath encompassing and contacting said metallic layer with said outer sheath generally engaging the corrugations of the metal armor and mechanically interlocking with the corrugations.

2. A composite tubing in accordance with claim 1, wherein said sampling line is composed of stainless steel and said metallic cover is composed of flexible corrugated steel armor.

3. A composite tubing in accordance with claim 1, wherein said tape is disposed in about a 25 percent overlap.

4. A composite tubing in accordance with claim 1, wherein the wall thickness of said polymeric outer sheath is relatively thin as compared to the wall thickness of said filler material.

5. A composite tubing product made in accordance with claim 1, wherein said layer of tape comprises an asbestos-polymeric material laminated tape.

6. A composite tubing product made in accordance with claim 5, wherein
said polymeric material comprises polyethylene terephthalate film.

7. A composite tubing product in accordance with claim 1, wherein
said heating lines comprise a wire having a non-metallic flexible covering thereon.

8. A composite tubing product in accordance with claim 7, wherein
said non-metallic cover includes a polymeric insulating tape.

9. A composite tubing product in accordance with claim 8, wherein
said insulating tape is covered with a fiberglass braid.

10. A composite tubing product in accordance with claim 1, wherein
the tape of said tape layer is spirally overlapped to provide a nominal buildup of a predetermined thickness.

* * * * *